Figure 1:
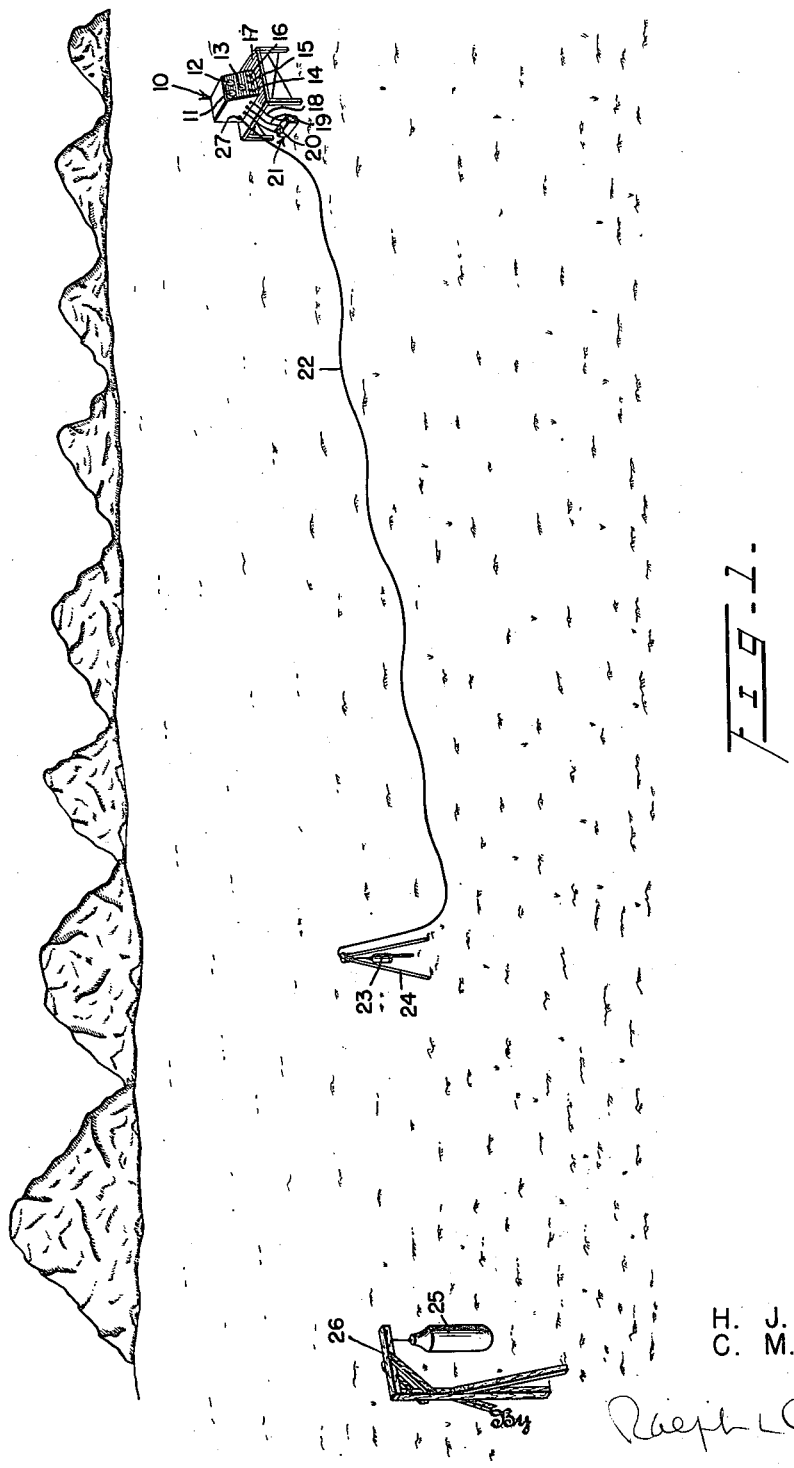

Nov. 25, 1952    H. J. PLUMLEY ET AL    2,618,962
ELECTRONIC BLAST GAUGE
Filed Sept. 17, 1945    2 SHEETS—SHEET 1

Inventors
H. J. PLUMLEY
C. M. RYERSON

Attorney

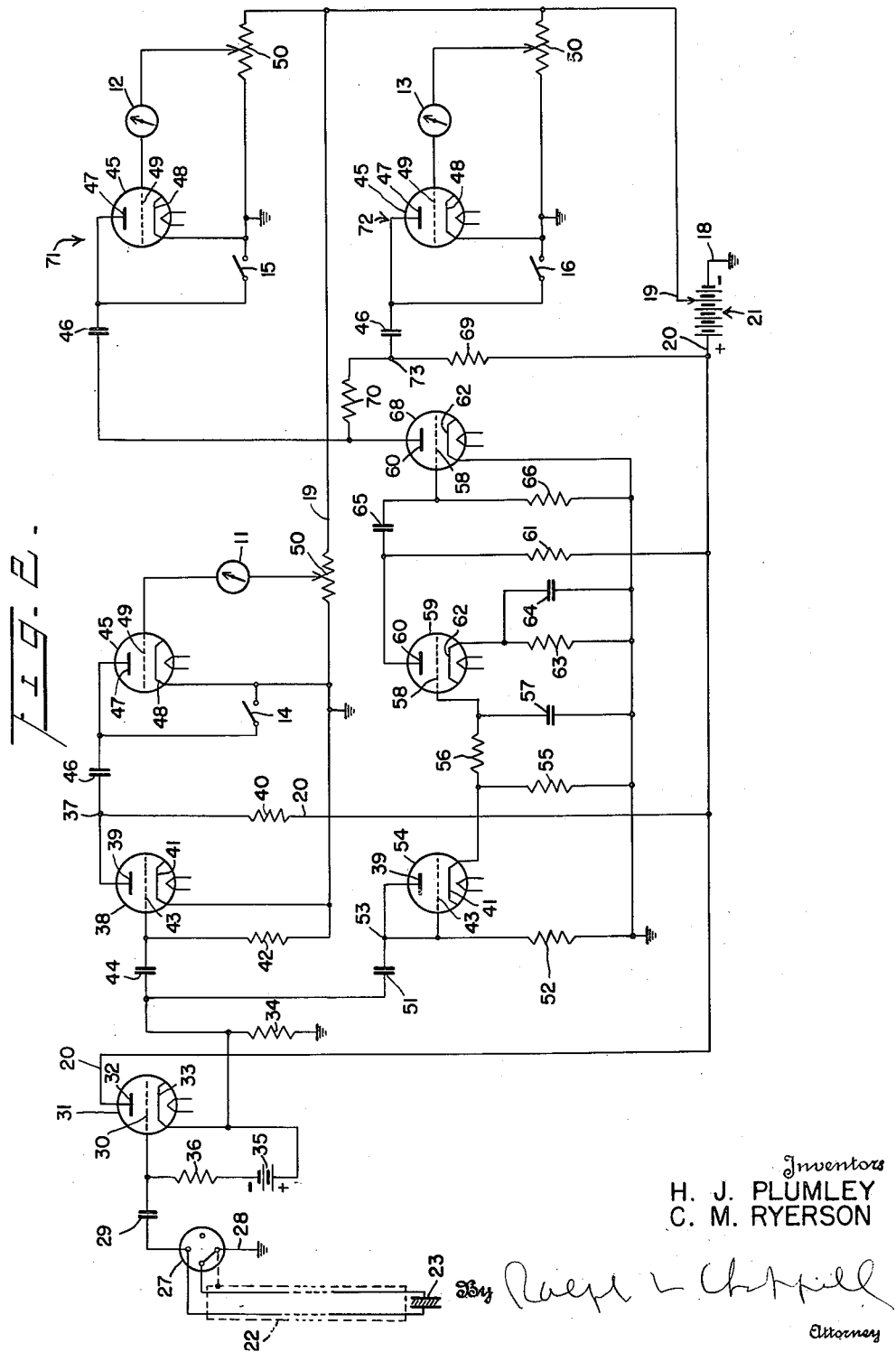

Patented Nov. 25, 1952

2,618,962

UNITED STATES PATENT OFFICE 2,618,962

ELECTRONIC BLAST GAUGE

Harold J. Plumley and Clifford M. Ryerson, Washington, D. C.

Application September 17, 1945, Serial No. 616,940

5 Claims. (Cl. 73—35)

(Granted under the act of March 3, 1883, as amended April 30, 1928; 370 O. G. 757)

This invention relates generally to gauges and more particularly to an electronic blast gauge adapted to measure pressure waves such, for example, as those generated by explosions.

It is generally known that a pressure wave or blast is usefully defined by the peak pressure and impulse of the blast at the point of measurement thereof, the impulse of the blast being measured by the area of its pressure-time curve.

Devices heretofore employed for measuring pressure waves generally have taken the form of apparatus comprising an electrical pickup device exposed to the blast and means for photographing a trace of the electrical impulse generated by the pickup device in response to the blast. In accordance with such arrangements, the output of the pickup device is amplified and fed into a cathode ray oscillograph, and the resulting trace, which gives the area of the pressure-time curve is photographed, the resulting film being developed in the usual manner. The peak pressure thereafter is determined by measurement of the amplitude of the trace, and the impulse is measured by integration of the area of the trace by use, by example, of a planimeter. The pressure calibration of the piezo-electric pickup normally is obtained either by static pressure tests or by propagation velocity measurements, propagation velocity being a known function of peak pressure.

Such prior art devices have not been found to be altogether satisfactory in use for the reason that apparatus of this type is not readily portable and time consuming operations are required in setting up the apparatus for use and in developing, analyzing and otherwise processing and interpreting the data on the film. Moreover, oscillographic type gauges frequently require elaborate devices to trigger the sweep circuit just in advance of the blast. Furthermore, in gauges of this character it frequently is necessary to make tests or measurements for the purpose of establishing approximate values in advance of the main or final measurements.

A broad object of the present invention is to provide a blast gauge in which peak pressure and impulse values of a measured blast or pressure wave may be indicated and recorded instantaneously.

Another object is to provide an electronic blast gauge in which peak pressure and impulse values may be measured instantaneously and recorded on easily read meters which are adapted to retain their readings for an interval sufficient to assure accurate readings of the values indicated and which thereafter readily may be reset for subsequent measurements.

Another object is to provide a portable blast gauge in which the use of synchronizing and triggering mechanisms may be obviated.

A further object is to provide an electronic blast gauge in which peak pressure and impulse values may be measured over a wide range of values without the need for establishing approximate values in advance of the final measurements.

An additional object is to provide an electronic blast gauge which may be operated on the output of a piezo-electric pickup and provide peak pressure and impulse values instantaneously in accordance with the amplitude and duration of the pickup output voltage.

Still other objects of the invention reside in the provision of an electronic blast gauge which is relatively simple in construction and operation and readily may be calibrated.

In accordance with the arrangement of the present invention, the blast gauge comprises means for converting the fast pulse of the piezo-electric pickup to a relatively slow voltage signal whose amplitude readily is measured by means of an electronic peak voltmeter, the voltage of the pickup being pre-amplified when desired. The voltmeter, when suitably calibrated, thus provides a measure of the peak pressure of the blast, the output of the pickup also being calibrated, as set forth hereinbefore.

The blast gauge also comprises an integrating circuit to which the output voltage of the piezo-electric pickup is applied, and the integrating circuit is arranged to develop a voltage having a peak value which gives a measure of the impulse or momentum of the pressure wave. This voltage, thereafter is amplified and measured, as in the case of measuring the peak pressure, by means of an electronic peak voltmeter which is suitably calibrated to read pressure-time or impulse values.

The integrating circuit may be of any type suitable for the purpose such, for example, as a high resistance leak connected in series with a storage capacitor. The ultimate charge, and hence voltage, on the capacitor is measured by the integral $$Q = EC = \int i \, dt$$

where $Q$ = the ultimate charge of the capacitor
$E$ = the ultimate voltage on the capacitor
$C$ = the capacitance of the capacitor
$i$ = the current in the integrating circuit If the leak is so chosen that the final capacitor voltage is only a small fraction of the voltage applied to the integrating circuit, then the current $i$ will at all times approximate the applied or pickup voltage, which, in turn, is at all times proportional to the applied blast pressure. The integral $\int i\,dt$ then measures the integral $\int p(t)\,dt$ which gives a measure of the area of the pressure-time curve, where $p$ is the instantaneous pressure of the blast at a given time $t$. The final voltage on the capacitor thus gives a measure of the impulse or momentum of the blast.

In the accompanying drawings wherein a preferred embodiment of the invention is disclosed:

Fig. 1 is a perspective view of a portable electronic blast gauge and its associated pickup unit as set up to measure the pressure wave in air resulting from the explosion of a bomb; and Fig. 2 is a diagrammatic view of a complete electronic circuit for the blast gauge and its associated pickup.

Referring now to the drawings for a more complete understanding of the invention and more particularly to Fig. 1 thereof, there is shown thereon a portable electronic blast gauge generally designated 10. The blast gauge comprises a suitable housing or container, the front portion of which is arranged as a ponel upon which are mounted suitable indicator meters 11, 12 and 13 and control buttons or switches 14, 15 and 16 for resetting the meters. As will appear in greater detail hereinafter in connection with the description of Fig. 2, the indicator meters operate under control of electronic circuits included within the container of the blast gauge and comprising two channels, the first of which is responsive to the peak value of the pressure wave and the second of which is responsive to the impulse value thereof.

The blast gauge, in use, may be supported upon a suitable bench or table 17 and leads 18, 19 and 20 from the gauge may be extended to a suitable source of power such, for example, as the battery 21 which may be disposed on the ground beside or beneath the table, as is desired. The blast gauge also includes an elongated input cable 22, preferably of a low capacitance, which may be extended at its free end a relatively great distance from the blast gauge and electrically connected to a piezo-electric pickup unit generally designated 23 and suspended from a suitable support such, for example, as the tripod 24. The pickup 23 may be of any suitable type adapted to generate a voltage in response to pressure waves occurring within the vicinity thereof, the pickup preferably comprising an array or assembly of crystals such, for example, as those well known in the art as Rochelle salt, tourmaline, quartz or A. D. P. crystals. The crystals, as illustrated, may be enclosed in any suitable container therefor adapted to provide sufficient mechanical inertia and to avoid rapid thermal changes.

Referring now to Fig. 2, it will be seen that the leads of cable 22 are secured at the blast gauge to the terminals of an input plug 27 mounted thereon, one of the leads being grounded through two of the terminals as at 28 and the other lead being connected through a third one of the terminals to a coupling condenser 29.

The voltage generated by pickup 23 in response to the shock wave generated by the explosion of bomb 25 is applied by way of coupling condenser 29 to the grid 30 of a conventional triode vacuum tube 31 which is connected as a part of a conventional cathode follower circuit.

The plate 32 of tube 31 is supplied by way of battery lead 20 from battery 21 and the cathode 33 of the tube is connected by way of cathode resistor 34 to ground potential. The grid 30 is normally negatively biased with respect to the cathode 33 by means of a bias battery 35, the battery being connected in series with a resistor 36 between the grid and cathode. The cathode follower circuit including tube 31 serves as an impedance transformer whereby a high impedance input is provided for pickup 23 and the output of the cathode follower circuit appearing across cathode resistor 34 provides a low impedance output to the aforesaid pressure and impulse channels controlled thereby.

The output of the cathode follower appearing across resistor 34 is applied simultaneously to the pressure and impulse channels. However, while the operation of these channels is concurrent, the complete operation of the pressure channel will first be considered in order to facilitate the description thereof.

The relatively sharp positive voltage pulse appearing across resistor 34 is converted into a relatively slow positive signal at 37 by means of a conventional diode and suitable associated circuits or by means of a triode vacuum tube amplifier 38 whose circuit parometers are suitably selected to effect the desired conversion. For this purpose plate 39 of tube 38 is supplied from battery lead 20 through a load resistor 40, and cathode 41 of the tube is connected at ground potential. The cathode is connected by way of resistor 42 to the grid 43 of tube 38 whereby the grid also is maintained normally at ground potential, thus causing the tube to be normally conductive.

When a voltage pulse appears across resistor 34, condenser 44 employed to couple the cathode follower circuit to the grid circuit of tube 38, is charged to the peak potential of the pulse, the charging current flowing by way of grid 43 and cathode 41 of tube 38 to ground. Under the foregoing operating conditions of tube 38, the effective impedance between the grid and cathode thereof is in the order of 1,000 ohms. Thus, with a condenser 44 of suitable capacitance, the condenser may be fully charged by the fast pulse within an interval in the order of $10^{-6}$ seconds. By reason of the one-way valve action of tube 38, however, the discharge of condenser 44 is by way of resistor 42, a voltage drop being developed thereacross which causes a negative voltage to be applied to grid 43 of tube 38. The value of resistor 42 is suitably selected such that the discharge time of condenser 44 is in the order of one-tenth of a second, thus causing a relatively slow negative signal to be applied to grid 43.

As tube 38 is normally conducting by reason of its zero grid bias, the fast positive pulse creates little change in the plate current of the tube. The slow negative signal, however, results in a large plate voltage swing at 37, and the amplitude of this voltage is a direct function of the peak magnitude of the fast positive pulse. Thus, an amplifier is provided which converts a fast pulse to a relatively slow voltage signal indicative of the peak pressure of a blast voltage signature and which is independent of the area under the voltage curve defining the signature.

The voltage signal appearing at 37 preferably is measured by a vacuum tube voltmeter of any type suitable for the purpose such, for example, as the inverted type voltmeter comprising triode 45. The operation of triode 45 is similar to the operation of the grid circuit of tube 38 in response to a fast pulse applied thereto, condenser 46 being charged by way of plate 47 and cathode 48 of tube 45 and thence to ground as the potential at point 37 increases. In this case, however, the discharge path for condenser 46 is by way of the substantially infinite impedance of tube 45. Thus, except for leakage through the tube and the normally open switch 14, which is shunted across the tube, no discharge path is provided for condenser 46. Accordingly, condenser 46 may be caused to retain its charge for a relatively long time if the leakage is held to a minimum. This may be accomplished in the use of polystyrene, steatite, or equivalent high resistance sockets, by use of wires with high insulation resistance and by the use of a high quality condenser 46.

As in the case of pulse amplifier 38, a positive voltage signal at 37 causes a negative potential to appear at plate 47 of tube 45. This negative potential or charge provides electrostatic control of the grid current of the tube, thus elevating the potential on grid 49 of the tube to a value which approaches the bias potential thereon provided by potentiometer 50 which is interconnected between battery lead 19 and ground. Meter 11 is connected in the grid circuit of tube 45 and thus measures the decrease in the grid current. Meter 11 preferably is calibrated so as to read in terms of peak values of pressure waves. Subsequent measurements thereafter are made upon discharge of condenser 46 by closing switch 14 which resets meter 11 to its initial position.

The output of the cathode follower appearing across resistor 34 is applied to the impulse channel by way of coupling condenser 51 and resistor 52. The output voltage appearing at 53 is rectified by a conventional triode vacuum tube, here connected as a diode, and the rectified voltage appears across resistor 55 at substantially the peak value of the output voltage, the voltage drop across tube 54 being only a small fractional portion of the output voltage. Tube 54 may be generally similar to tube 38 and, accordingly, like reference characters are assigned to the elements thereof.

An integrating circuit comprising series connected resistor 56 and condenser 57 is shunted across resistor 55. The resistance and capacitance values of resistor 56 and condenser 57 respectively are selected such that the charging current to condenser 57 is at all times substantially proportional to the rectified voltage appearing across resistor 55 and such that the ultimate value of the voltage across condenser 57 is but a small fractional portion of the rectified voltage. Under these conditions, as set forth hereinbefore, the ultimate charge and voltage on condenser 57 gives a measure of the momentum associated with the voltage impulse generated by pickup 23 in response to the explosive blast generated by bomb 25.

The voltage on condenser 57 is applied to grid 58 of a conventional triode vacuum tube amplifier 59, the plate 60 of which is supplied through plate load resistor 61 from battery lead 20 and the cathode 62 of which is connected through self-bias resistor 63 to ground, an A. C. bypass condenser 64 being provided in the usual manner.

The voltage appearing at the plate 60 of the tube 59 is applied by way of coupling condenser 65 and resistor 66 to the grid 58 of a conventional triode vacuum tube amplifier 68 and is further amplified thereby, the principal function of amplifier 68 being to invert the phase of the amplified voltage produced by tube 59. Tube 68 may be generally similar to tube 59 and like reference characters are employed to designate corresponding elements. The plate circuit of tube 68 is supplied from a battery lead 20 and includes a pair of load resistors 69 and 70, these resistors serving as a voltage divider network whereby different voltage values may be selected therefrom for the purpose of providing different sensitivity ranges.

For example, the voltage appearing at the plate 60 of amplifier 68 is applied to a vacuum tube voltmeter generally designated 71 and which may be identical to the vacuum tube voltmeter of the pressure channel. The meter 12 of voltmeter 71, however, is suitably calibrated so as to read in terms of pressure-time values covering a predetermined range of values, and the meter is reset by its associated switch 15.

Similarly, a vacuum tube voltmeter generally designated 72, which also may be identical to the voltmeter of the pressure channel, is arranged to measure the voltage at point 73 in the voltage divider network in the plate circuit of tube 68, meter 13 of voltmeter 72 being suitably calibrated to read in terms of pressure-time values covering a range of values larger than those included in the range covered by meter 71. Meter 13 is reset by its associated reset switch 16.

From the foregoing it should now be apparent that a blast gauge has been provided which is well adapted to fulfill the aforestated objects of the invention. Moreover, while certain specific circuit arrangements have been disclosed which give satisfactory results, it will be apparent to those skilled in the art to which the invention appertains that various other circuit arrangements and modifications thereof may be employed without departing from the spirit and scope of the invention defined in the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In an electronic blast gauge for measuring the fast voltage pulse generated by a piezo-electric pickup in response to a pressure wave, a cathode follower operatively connected to said pickup and providing a low impedance output for said pickup and adapted to produce an aperiodic positive output voltage pulse corresponding to the voltage pulse generated thereby, a grid controlled amplifier stage having a high grid to ground resistance and substantially zero cathode to ground impedance, a condenser coupling said output pulse to said grid whereby said pulse causes grid current to charge said condenser without increasing the main space current in said stage and said charge changes said space current at the end of said pulse in accordance with the peak value thereof until substantially altered by the discharge of said condenser through said resistor, and an electronic voltmeter coupled to said stage and adapted to indicate said peak voltage value for an interval sufficient to permit accurate reading thereof.

2. An electronic blast gage for measuring the impulse of an explosive blast which comprises, means for generating a voltage pulse corresponding to the pressure wave of the blast, impedance matching means for presenting a low output impedance to said generating means, means for rectifying the electrical signal output of said impedance matching means, a resistive load circuit across which the output of said rectifying means is developed, an integrating circuit including a resistance capacitor combination in which the charging current to the capacitor is proportional to the output appearing across said resistive load so that the ultimate charge on the capacitor is a measure of the impulse of the pressure wave, means for amplifying the output signal from the integrating circuit, and indicating means responsive to the output signal from said amplifying means for indicating the impulse of the blast.

3. An electronic blast gage for measuring the impulse and peak pressure of an explosive blast which comprises, means for generating a voltage pulse corresponding to the pressure wave of the blast, impedance matching means for presenting a low output impedance to said generating means, means for rectifying the electrical signal output of said impedance matching means, a resistive load circuit across which the output of said rectifying means is developed, an integrating circuit including a resistance capacitor combination in which the charging current to the capacitor is proportional to the output of said resistive load circuit so that the ultimate charge on the capacitor is a measure of the impulse of the pressure wave, a first indicating means responsive to the signal output from said integrating circuit for indicating the impulse of the blast, converting means responsive to the voltage pulse output of said impedance matching means for converting said voltage pulse to a substantially sustained signal which is proportional to the peak value of the pressure wave, and a second indicating means responsive to the output of said converting means for indicating the peak value of the pressure wave simultaneously with the indication of impulse on the first indicating means.

4. In an electronic blast gage for measuring the fast voltage pulse generated by a pickup device which is responsive to a pressure wave, a cathode follower operatively connected to said pickup and providing a low impedance output for said pickup and adapted to produce a periodic positive voltage output corresponding to the voltage pulse generated thereby, a grid controlled amplifier stage having a high grid to ground resistance and substantially zero cathode to ground impedance, a condenser coupling said output pulse to said grid whereby said pulse causes current to charge said capacitor without increasing the main space current in said stage and said charge changes said space current at the end of said pulse in accordance with the peak value thereof until substantially altered by the discharge of said condenser through said resistor, a first indicating means coupled to said stage and adapted to indicate said peak voltage value for an interval sufficient to permit accurate reading thereof, means responsive to the output of said cathode follower for producing a voltage proportional to the total energy of said pressure wave, and a second indicating means for indicating said total energy simultaneously with the indication of peak value on said first indicating means.

5. In an electronic blast gage for measuring the fast voltage pulse generated by a pickup device which is responsive to a pressure wave, a cathode follower operatively connected to said pickup and providing a low impedance output for said pickup and adapted to produce a periodic positive output voltage pulse corresponding to the voltage pulse generated thereby, a grid controlled amplifier stage having a high grid to ground resistance and substantially zero cathode to ground impedance, a condenser coupling said output pulse to said grid whereby said pulse causes grid current to charge said condenser without increasing the main space current in said stage and said charge changes said space current at the end of said pulse in accordance with the peak value thereof until substantially altered by the discharge of said condenser through said resistor, a first indicating means coupled to said stage and adapted to indicate said peak voltage value for an interval sufficient to permit accurate reading thereof, means for rectifying the voltage pulse output of said cathode follower, integrating means driven by the output of said rectifying means for producing a voltage proportional to the total energy of said pressure wave, and a second indicating means responsive to the output of said integrating means so as to indicate the total energy of said pressure wave simultaneously with the indication of peak pressure value on said first indicating means.

HAROLD J. PLUMLEY.
CLIFFORD M. RYERSON.

REFERENCES CITED

The following references are of record in the file of this patent:

UNITED STATES PATENTS

| Number | Name | Date |
|---|---|---|
| 1,933,733 | Terman | Nov. 7, 1933 |
| 2,227,906 | Kellogg | Jan. 7, 1941 |
| 2,301,195 | Bradford | Nov. 10, 1942 |
| 2,309,560 | Welty | Jan. 26, 1943 |
| 2,323,762 | George | July 6, 1943 |
| 2,337,522 | Eldredge | Dec. 21, 1943 |
| 2,350,545 | Bradford | June 6, 1944 |
| 2,448,322 | Piety | Aug. 31, 1948 |